United States Patent
Reed et al.

(10) Patent No.: US 7,613,717 B1
(45) Date of Patent: Nov. 3, 2009

(54) AUTOMATED SYSTEM FOR RATING CUSTOMER FEEDBACK

(75) Inventors: Michael L. Reed, San Diego, CA (US); Diane M. Wewerka, Poway, CA (US)

(73) Assignee: Teradata US, Inc., Miamisburg, OH (US)

(*) Notice: Subject to any disclaimer, the term of this patent is extended or adjusted under 35 U.S.C. 154(b) by 154 days.

(21) Appl. No.: 10/055,828

(22) Filed: Oct. 26, 2001

(51) Int. Cl.
  *G06F 7/00* (2006.01)
  *G06F 17/00* (2006.01)

(52) U.S. Cl. ............ 707/102; 707/3; 707/10; 709/203; 709/219

(58) Field of Classification Search ........... 705/10–11, 705/26, 27; 709/203, 219; 707/3, 5, 6, 102, 707/104.1; 704/1, 9
See application file for complete search history.

(56) References Cited

U.S. PATENT DOCUMENTS

| | | | | |
|---|---|---|---|---|
| 5,371,807 A | * | 12/1994 | Register et al. | 382/159 |
| 5,566,349 A | * | 10/1996 | Trout | 710/20 |
| 5,864,862 A | * | 1/1999 | Kriens et al. | 707/103 R |
| 5,960,194 A | * | 9/1999 | Choy et al. | 707/102 |
| 5,987,415 A | * | 11/1999 | Breese et al. | 704/270 |
| 6,026,387 A | * | 2/2000 | Kesel | 706/52 |
| 6,029,195 A | * | 2/2000 | Herz | 725/116 |
| 6,032,184 A | * | 2/2000 | Cogger et al. | 709/223 |
| 6,332,143 B1 | * | 12/2001 | Chase | 707/100 |
| 6,349,290 B1 | * | 2/2002 | Horowitz et al. | 705/35 |
| 6,510,427 B1 | * | 1/2003 | Bossemeyer et al. | 707/6 |
| 6,539,392 B1 | * | 3/2003 | Rebane | 707/101 |
| 7,065,494 B1 | * | 6/2006 | Evans | 705/10 |
| 2002/0044687 A1 | * | 4/2002 | Federman | 382/187 |
| 2002/0059283 A1 | * | 5/2002 | Shapiro et al. | 707/100 |
| 2002/0103801 A1 | * | 8/2002 | Lyons | 707/9 |
| 2004/0018477 A1 | * | 1/2004 | Olsen | 434/307 R |

OTHER PUBLICATIONS

Susan Feldman, *Find What I Mean, Not What I Say: Meaning-Based Search Tools*, Online Inc., May/Jun. 2000, pp. 1-9.
Dan Sullivan, *Five Principles of Intelligent Content Management*, Intelligent Enterprise Magazine, Aug. 31, 2001, pp. 1-11.
San Diego Daily Transcript, *Be-Bee Taps Into Natural Language Processing Technology*, Nov. 13, 2001, pp. 1-3.
William M. Bulkeley, *Echomail Provides an Answer for the Avalanche of E-Mail*, The Wall Street Journal, Nov. 15, 2001, pp. 1-3.

* cited by examiner

*Primary Examiner*—Shahid A Alam
*Assistant Examiner*—Susan F Rayyan
(74) *Attorney, Agent, or Firm*—Trop, Pruner & Hu; John D. Cowart; James Stover

(57) ABSTRACT

A method and apparatus receives customer feedback and analyzes words in the customer feedback. The words in the customer feedback are compared to rating data to generate an indication to rate the customer feedback. The rating data associates predefined words with respective values. In one arrangement, the rating data is according to a user-defined data type (UDT) stored in a relational table.

21 Claims, 4 Drawing Sheets

FIG. 3

CUSTOMER FEEDBACK TABLE ~202

| CUSTOMER_ID | ... | FEEDBACK | TIMESTAMP |
|---|---|---|---|
| | ⋮ | | |

FEEDBACK RATING TABLE ~200

| ID | FEEDBACK SCORE |
|---|---|
| ID1 | [ARRAY 1] |
| ID2 | [ARRAY 2] |
| | ⋮ |

FIG. 4

ADJECTIVES (SCORE MODIFIERS)

| WORD | RAW SCORE | VIEW | EXTREMELY |
|---|---|---|---|
| ANGER | -5 | 2 | 4 |
| JOY | +7 | 2 | 4 |
| SAD | -2 | 2 | 4 |
| SURPRISE | +7 | 2 | 4 |
| DISGUST | -4 | 2 | 4 |

AUTOMATED SYSTEM FOR RATING CUSTOMER FEEDBACK

BACKGROUND

Businesses and other concerns are continuing to look for better and more cost-effective ways of performing marketing campaigns as well as managing customer relationships. With improved communications technology and the development of the World Wide Web, direct marketing campaigns are often performed "on-line"; that is, marketing is performed by communications over a data network, such as the Internet. Such communications are often in the form of electronic mail (e-mail) sent directly to potential customers. Alternatively, as users browse through various websites, advertisement banners are displayed on various parts of the web pages being viewed by the users.

Improvements in technology have also made collecting customer feedback more convenient. For example, if a customer wishes to express a complaint or to provide some other type of feedback, the customer is able to send an e-mail directly to the customer service center of the respective business, in addition to or instead of calling the customer service center by telephone. Another possibility is that customers are able to access a feedback page provided by a website of a business, with customers being able to type in their feedback directly into a comments box in the displayed web page.

Traditionally, customer service representatives have to manually review the feedback provided by customers to determine whether customers are satisfied or not with goods or services provided by a business. For large businesses, the amount of feedback can be massive, and the amount of resources that are needed to review the feedback of customers or users can be quite large and costly.

SUMMARY

In general, an improved method and apparatus is provided for determining customer feedback. For example, a method executable by a system comprises receiving customer feedback, analyzing words in the customer feedback, and associating at least some of the words with respective one or more values. An indication to rate customer feedback is generated based on the one or more values.

Other or alternative features will become more apparent from the following description, from the claims, and from the drawings.

BRIEF DESCRIPTION OF THE DRAWINGS

FIG. 3 illustrates tables stored in the database system of FIG. 1.

FIG. 4 illustrates an array of words and associated raw scores.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
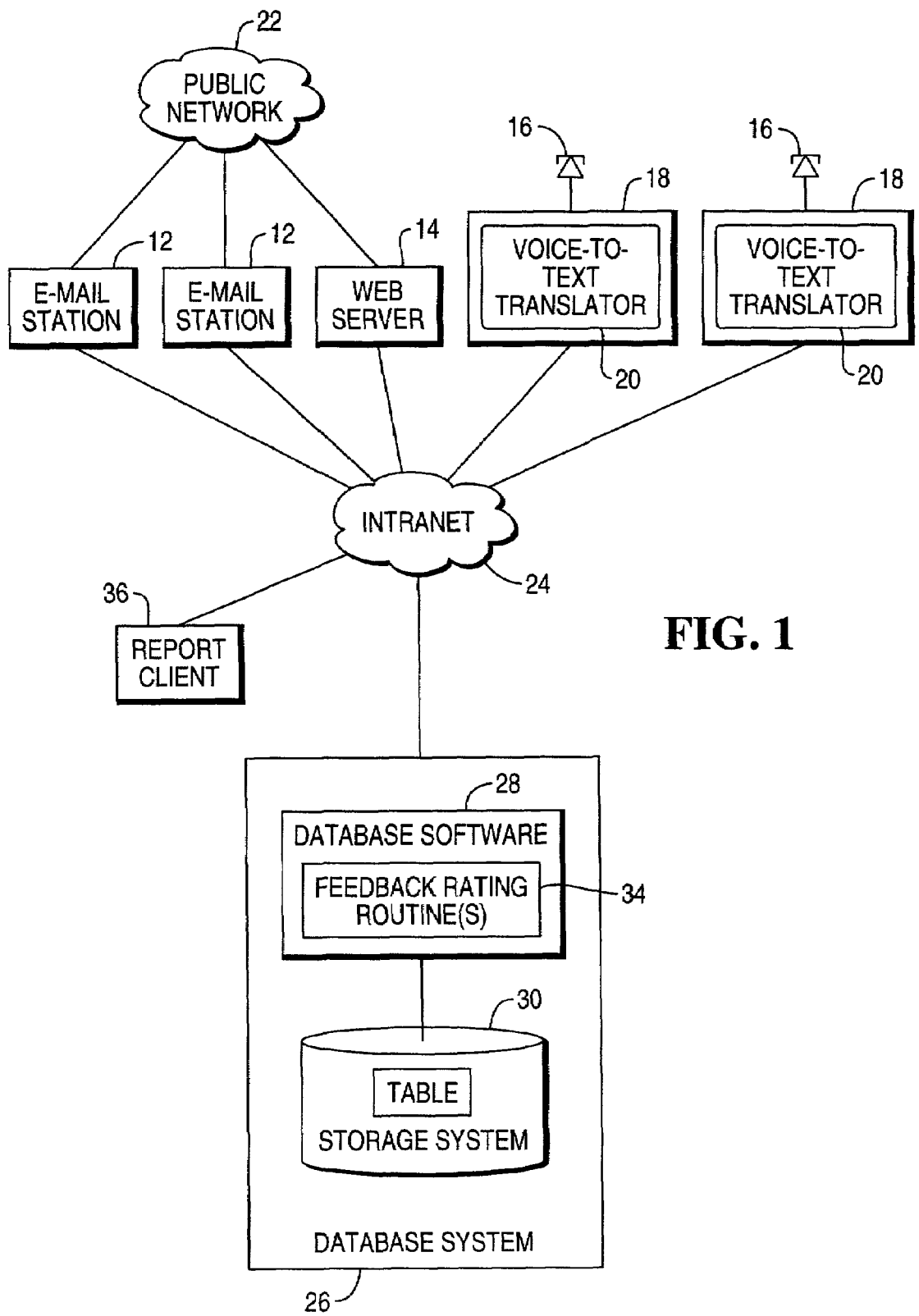
FIG. 1 is a block diagram of an example arrangement of systems, including a database system in accordance with an embodiment.

FIG. 1 shows an arrangement of systems that are associated with an enterprise, such as a business, educational entity, government agency, or other concern. The enterprise includes various stations 12 to send and/or receive electronic mail (e-mail). In addition, a web server 14 is provided that enables customers to access various web pages associated with the enterprise. Also, various telephones 16 are part of the enterprise. These telephones 16 are used by customer representatives, for example, to communicate with customers. As used here, a "customer" refers to any person that uses or purchases a good or service provided by an enterprise.

The telephones 16 are coupled to one or more translator systems 18, each including a voice-to-text translator 20. Thus, any conversation between the customer representative (using a telephone 16) and a remote customer monitored by the translator system 18 is converted by the voice-to-text translator 20 into text format. In one embodiment, the voice-to-text translator 20 is implemented as software. However, in other embodiments, the voice-to-text translator 20 is implemented as hardware or a combination of hardware and software.

The e-mail stations 12, web server 14, telephones 16, and translator systems 18 are part of the customer service infrastructure of the enterprise. The e-mail stations 12 and web server 14 are coupled to a public network 22. One example of the public network 22 is the Internet. The e-mail stations 12 and web server 14 are also coupled to an intranet 24, which is a private network of the enterprise. Examples of the intranet 24 include a local area network (LAN), a wide area network (WAN), a virtual private network (VPN), or any other network.

A database system 26 is also coupled to the intranet 24. In the arrangement of FIG. 1, each of the e-mail stations 12, web server 14, and translator systems 18 are able to issue statements to the database system to write data to the database system 26 for storage. The database system 26 includes database software 28 that manages access and updates of data stored in a storage system 30.

Another system that is coupled to the intranet 24 is a report client 36. The report client 36 is able to access various features of the database system 26 to determine customer feedback. In accordance with some embodiments of the invention, the report client uses data stored in the database system 26 according to user-defined data types (UDTs) as well as methods associated with the UDTs in the database system 26 to summarize or rate the customer feedback.

In one example, the database system 26 is a relational database management system (RDBMS). An RDBMS stores data in relational tables that are made up of rows and columns. Each row represents an occurrence of an entity defined by a table, with an entity being a person, place, or thing about which the table contains information.

To extract data from, or to update, a relational table, queries according to a standard database query language are used (e.g., Structured Query Language or SQL). One version of SQL is provided by the SQL-92 Standard. Another version of SQL is provided by the SQL-99 Standard, also referred to as the SQL-3 Standard.

One enhancement provided by SQL-99 over SQL-92 is the definition of user-defined data types (UDTs) in addition to predefined data types. Examples of predefined data types include the number data type for representing numeric values, character string data type for representing a sequence of characters, and so forth. A characteristic of predefined SQL data types is that the inherent structure of the data type is already defined by the SQL Standard. UDTs, on the other hand, are not predefined; instead, UDTs are created by programmers, such as those working for a database vendor, customer, and so forth.

In accordance with some embodiments of the invention, table or tables stored in the storage system 30 of the database system 26 contain data according to a UDT (referred to as FeedbackUDT) to enable efficient and convenient determination of customer feedback based on information provided by the e-mail stations 12, web server 14, and/or translator systems 18. In addition to the FeedbackUDT, feedback rating routine(s) 34 are also part of the database software 28. In one embodiment, the feedback rating routine(s) 34 are UDT methods. One or more methods are associated with a UDT. Methods are routines or functions that are invoked to perform tasks with respect to UDT data.

Figure 2:
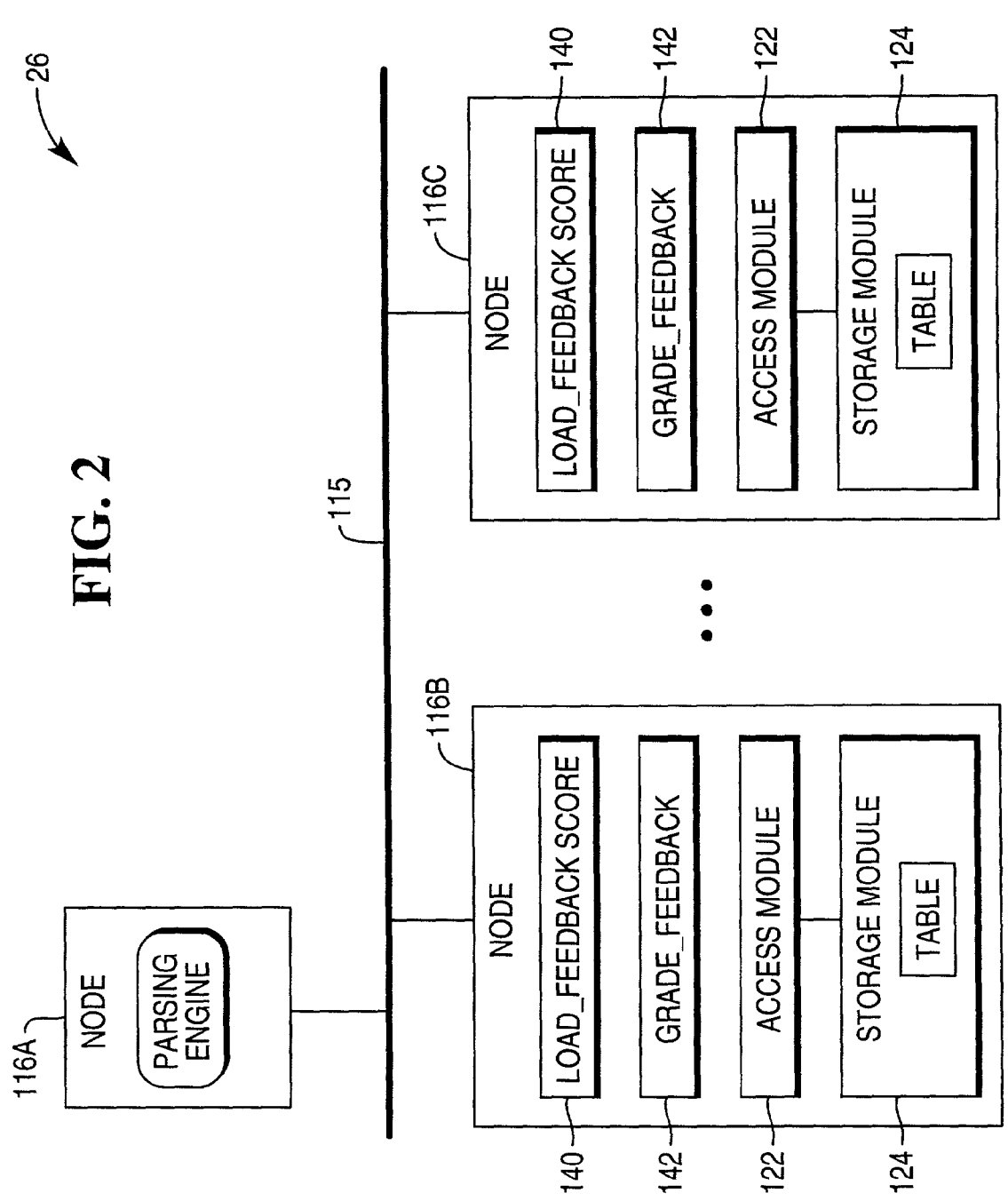
FIG. 2 is a block diagram of components of the database system of FIG. 1.

As shown in FIG. 2, according to one arrangement, the database system 26 includes a plurality of nodes 116A, 116B, and 116C that are coupled together by an interconnect layer 115. The node 116A is coupled to the intranet 24, and in the illustrated embodiment, includes a parsing engine (PE) or query coordinator 118. The parsing engine 118 interprets a query, checks the query for proper SQL syntax, and sends out executable actions to be performed by the nodes 116B, 116C.

Each of the nodes 116B, 116C includes one or more access modules 122. One example of the access module 122 is the access module processor (AMP) used in some TERADATA® database systems from NCR Corporation. The access modules 124 and parsing engine 118 are considered part of the database management software 28. The access module 122 is responsible for managing access to respective portions of a database. As shown in FIG. 2, each access module 122 manages access to data stored in a respective storage module 124. Although shown as discrete components, the storage module 124 can be part of the same storage system (e.g., storage system 30 in FIG. 1), with the storage modules 124 representing different partitions of the storage system.

Each storage module 124 stores one or more tables. Because the database system 26 shown in FIG. 2 is a parallel database system that enables concurrent access of different portions of a table, each table is distributed among plural storage modules 124. Note that each node 116 can contain one access module 122 or plural access modules 122.

In a different embodiment, instead of having plural nodes, the parallel database system 26 is implemented as a single node multiprocessing system that has plural processors. In yet another embodiment, a uni-processor database system is used. Thus, embodiments of the invention are applicable to either multiprocessing database systems or non-multiprocessing database systems.

As shown in FIG. 3, in accordance with one embodiment, a feedback rating table 200 is stored in the database system 26. In addition, a customer feedback table 202 is also stored in the database system 26. In the database system arrangement shown in FIG. 2, each of the tables 200 and 202 is distributed across plural access modules 122 and storage modules 124. In other words, the tables 200 and 202 are divided into multiple portions for storage on respective storage modules 124. Using the data stored in the tables 200 and 202, as well as the feedback rating routine(s) 34, an efficient and convenient mechanism is provided for determining customer feedback.

In one implementation, text contained in e-mails received by the e-mail stations 12 are stored in the customer feedback table 202. Also, the text of any feedback received at the web server 14 is also stored in the customer feedback table 202. Conversational feedback received by the translator systems 18 are translated to text, which are written to the customer feedback table 202. The e-mail stations 12, web server 14, and translator systems 18 are capable of generating SQL queries, such as INSERT statements, to add rows to the customer feedback table 202.

Using the feedback data stored in the customer feedback table 202, and using a rating scheme stored in the feedback rating table 200, a "score" can be derived from the customer feedback data. The "score" is an indication of a level of customer feedback, such as customer satisfaction or dissatisfaction, customer emotion, customer approval or disapproval, and so forth.

As shown in FIG. 3, the customer feedback table 202 includes various columns, including a CUSTOMER_ID column (to provide unique identifiers for respective customers or users), a feedback column (which contains the feedback data from the customer), and a Timestamp column (which contains an indication of the date and time of the collected feedback). The Feedback column is a string of text the containing customer feedback.

The feedback rating table 200 includes an ID column and a Feedback_Score column. Each entry of the Feedback_Score column contains an array of keywords and associated scores. In accordance with one embodiment, the arrays stored in the Feedback_Score column are according to the FeedbackUDT.

An example of an array stored in the Feedback_Score column is shown in FIG. 4. In the FIG. 4 array, the various words that are associated with respective scores are "anger," "joy," "sad," "surprise," and "disgust." The words shown are provided as an example only, and are not meant to be exhaustive. Many other words can be associated with raw scores, with such other words indicating user satisfaction or dissatisfaction, approval or disapproval, or any other type of feedback that an enterprise is interested in.

In the example of FIG. 4, the word "anger" has a raw score of −5, which is a negative number to indicate a negative customer feedback. On the other hand, the word "joy" has a raw score of +7, which is a positive number to indicate a positive customer feedback. The word "sad" has a raw score of −2, the word "disgust" has a raw score of −4, and the word "surprise" has a raw score of +7.

As shown in FIG. 4, the words can also be associated with adjectives, such as "very" or "extremely." Such adjectives increase the score of the word. For example, the word "very" adds a factor of 2 to the score. Thus, the terms "very sad" would have a score of 2*−2=−4. The word "extremely" adds a factor of 4 to the score. Thus, the terms "extremely joyful" would have a score of 4*7=28.

Each row of the feedback rating table 200 is associated with a unique ID. For example, in FIG. 3, the first row has ID1, while the second row has ID2. The different rows contain different arrays of keywords and associated scores. This provides flexibility for an enterprise in rating customer feedback. For example, different arrays can be used for persons in different age groups, with different backgrounds, in different professions, and so forth.

As shown in FIG. 2, two UDT methods are associated with the FeedbackUDT. The methods include a Load_FeedbackScore method 140 and a Grade_Feedback method 142. In one example embodiment, the Load_FeedbackScore method 140 has the following syntax: Load_FeedbackScore (Feedback_Score: FeedbackUDT, Feedback_Term: string, Raw_Score: integer).

The Load_FeedbackScore method 140 loads a word (Feedback_Term) and associated score (Raw_Score) into a Feedback_Score object in the feedback rating table 200. Although not shown, the corresponding ID of the Feedback_Score object to which the word and score are to be added can also be specified as a parameter in the Load_FeedbackScore method 140. Alternatively, instead of loading one term at a time, an entire array of words and scores can be specified in the Feedback_Term and Raw_Score parameters for loading into the feedback rating table 200.

Additional parameters are also specified in the Load_FeedbackScore method 140 to add values for the score modifiers "Very," "Extremely," and so forth.

The Grade_Feedback routine 142 has the following syntax: Score=Grade_Feedback (Feedback_Score: FeedbackUDT, Feedback_List: array of string, Textdoc: Text).

The Grade_Feedback method 142 returns a score that indicates the intensity (either positive or negative) of the customer feedback contained in Textdoc. The parameter Textdoc contains a string including the text of the customer feedback, such as text in an e-mail, text received at the web server 14, and/or text provided by a translator system 18.

The parameter Feedback_List contains either a null value or a list of words that are of interest. If Feedback_List has a null value, then all words in Textdoc are examined for matching to the UDT array Feedback_Score in the feedback rating table 20. However, if Feedback_List has a list of one or more words, then only those words in Textdoc matching the list are considered, with a score derived for those words by accessing Feedback_Score in the feedback rating table 200.

An example statement for performing a join of the customer feedback table 202 and feedback rating table 200 to rate a customer feedback is provided below:

SELECT Grade_Feedback (Feedback_Score, Feedback_List, Textdoc) FROM CUSTOMER_FEEDBACK_TABLE, FEEDBACK_RATING_TABLE WHERE Grade_Feedback (Feedback_Score, Feedback_List, Textdoc)>10 AND FEEDBACK_RATING_TABLE.ID=ID1

As specified in the statement above, the Feedback_Score array having identifier ID1 in the feedback rating table 200 is used to calculate a score for the text in Textdoc that match words in Feedback_List (assuming a non-null value). If Grade_Feedback( ) returns a value greater than 10, then the value of Grade_Feedback( ) is selected for output in the query result.

Figure 5:
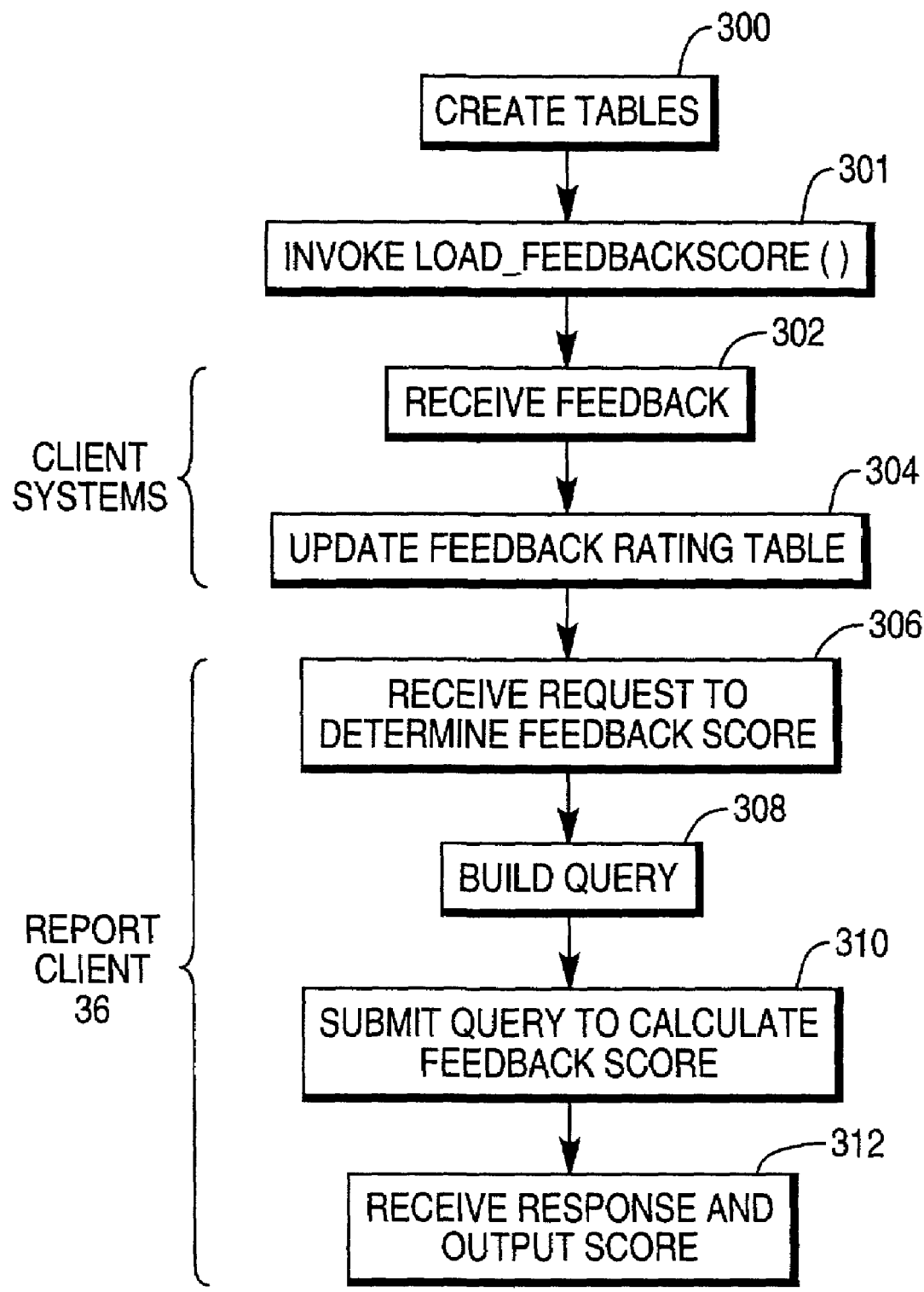
FIG. 5 is a flow diagram of a process in accordance with an embodiment.

A process according to one embodiment of the invention is shown in FIG. 5. A system, such as the report client 36 or another system, creates (at 300) the customer feedback table 202 and the feedback rating table 200 in the database system 26. Next, the system loads (at 301) values into the feedback rating table 200 by calling the Load_FeedbackScore method 140. The Load_FeedbackScore method 140 can be invoked a plurality of times to load multiple values, words, or entries.

The one or more client systems, including the e-mail systems 12, web server 14, and translator systems 18, receive feedback from customers (at 302). The feedback is provided in some format, such as text format, in queries submitted (at 304) to the database system 26 for insertion into the customer feedback table 202.

The report client 36 next determines if it has received a request to determine the feedback score (at 306). The request can be submitted by a user or an application. In response, the report client 36 builds (at 308) a query, which can be similar to the SELECT statement shown above. The query is then submitted to a database system 26 to calculate one or more feedback scores (at 310). Upon receipt of the response from the database system 26, the report client 36 outputs (at 312) the one or more scores. As examples, the output 36 is displayed, printed, or presented by some other means.

Instructions of the various software routines or modules discussed herein (such as the methods 140 and 142, the access modules 122) are stored on one or more storage modules in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored in respective storage modules, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to each device or system in one of many different ways. For example, code segments including instructions stored on floppy disks, CD or DVD media, or a hard disk are loaded into the device or system and executed as corresponding software modules or layers.

While the invention has been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A method executable by an automated system without requiring intervention by a human user, comprising:
    associating values with a plurality of predefined words;
    defining a user-defined data type having one or more data structures for storing said predefined words and associated values;
    invoking a first routine associated with the user-defined data type to load the predefined words and respective values in the one or more data structures;
    receiving from a client system customer feedback in the form of textual comments that originate with a human customer of an enterprise;
    comparing words in the customer feedback with said predefined words;
    invoking a second routine associated with the user-defined data type to calculate a score based on an identification of at least one word in the customer feedback as equivalent to one of said predefined words contained in the one or more data structures and the value of said equivalent one of said predefined words;
    presenting an indication to rate said customer feedback to a customer representative for said enterprise, said indication being based on said score.

2. The method of claim 1, wherein the one or more data structures comprise an array of the predefined words and associated values.

3. The method of claim 1, wherein invoking the first and second routines comprises invoking functions associated with the user-defined data type.

4. The method of claim 1, further comprising storing the one or more data structures in a first relational table.

5. The method of claim 4, further comprising storing customer feedback in a second relational table,
   wherein generating the score is based on performing a join of the first and second relational tables.

6. The method of claim 4, further comprising distributing the relational table across plural access modules.

7. The method of claim 1, wherein receiving the customer feedback comprises receiving the customer feedback in electronic mail.

8. The method of claim 1, wherein receiving the customer feedback comprises receiving customer-entered feedback at a web server.

9. The method of claim 1, wherein receiving the customer feedback comprises translating voice feedback to text feedback.

10. The method of claim 1, wherein receiving the customer feedback comprises receiving the customer feedback in a database system.

11. An article comprising at least one storage medium containing instructions that when executed cause an automated system, without requiring intervention by a human user, to:
   cause the system to store rating data according to a user-defined data type having one or more data structures, the rating data associating a plurality of predefined words with respective values;
   invoke a first routine associated with the user-defined data type to load said plurality of predefined words and respective values in said one or more data structures;
   compare words in customer feedback received from a client system in the form of textual comments that originate with a human customer of an enterprise with said plurality of predefined words;
   invoke a second routine associated with the user-defined data type to calculate a score based on an identification of at least one word in the customer feedback as equivalent to one of said predefined words contained in the one or more data structures and the value of said equivalent one of said predefined words; and
   present an indication to rate said customer feedback to a customer representative for said enterprise, said indication being based on said score.

12. The article of claim 11, wherein the instructions when executed cause the system to generate the indication by generating an indication of customer satisfaction or dissatisfaction.

13. The article of claim 11, wherein the instructions when executed cause the system to generate the indication by generating an indication of customer approval or disapproval.

14. The article of claim 11, wherein the instructions when executed cause the system to generate the indication by generating an indication of customer emotion.

15. The article of claim 11, wherein the instructions when executed cause the system to store a negative value for a predefined word having a negative connotation and a positive value for a predefined word having a positive connotation in the rating data.

16. The article of claim 15, wherein the instructions when executed cause the system to store modifier values for adjectives to increase the positive and negative values of the words.

17. The article of claim 11, wherein the instructions when executed cause the system to load the rating data into a relational table.

18. An automated system comprising:
   one or more storage modules to store rating data according to a user-defined data type having one or more data structures, the rating data associating a list of predefined words with respective values; and
   a controller adapted to:
   invoke a first routine associated with the user-defined data type to load said plurality of predefined words and respective values in said one or more data structures;
   compare words in customer feedback received from a client system in the form of textual comments that originate with a human customer of an enterprise with said plurality of predefined words;
   invoke a second routine associated with the user-defined data type to calculate a score based on an identification of at least one word in the customer feedback as equivalent to one of said predefined words contained in the one or more data structures and the value of said equivalent one of said predefined words; and
   presenting an indication to rate said customer feedback to a customer representative for said enterprise, said indication being based on said score.

19. The system of claim 18, the one or more modules to store the rating data in a first relational table.

20. The system of claim 19, the one or more storage modules to store the customer feedback in a second relational table.

21. The system of claim 20, wherein the controller is adapted to perform a join of the first and second relational tables to perform the comparison.

* * * * *